(12) United States Patent
Feeser et al.

(10) Patent No.: US 8,296,756 B1
(45) Date of Patent: Oct. 23, 2012

(54) PATCH CYCLE MASTER RECORDS MANAGEMENT AND SERVER MAINTENANCE SYSTEM

(75) Inventors: Colin L. Feeser, Atlanta, GA (US); Todd R. Santello, Smyrna, GA (US); Roby L. Bedford, Douglasville, GA (US)

(73) Assignee: Southern Company Services, Inc., Atlanta, GA (US)

(*) Notice: Subject to any disclaimer, the term of this patent is extended or adjusted under 35 U.S.C. 154(b) by 585 days.

(21) Appl. No.: 12/614,123

(22) Filed: Nov. 6, 2009

(51) Int. Cl.
*G06F 9/44* (2006.01)
(52) U.S. Cl. .......................................... 717/173
(58) Field of Classification Search .......... 717/168–174; 709/221, 224, 223, 226; 719/311, 328; 726/21, 726/25; 714/2; 713/191; 345/568
See application file for complete search history.

(56) References Cited

U.S. PATENT DOCUMENTS

| | | | |
|---|---|---|---|
| 2004/0003266 A1* | 1/2004 | Moshir et al. | 713/191 |
| 2006/0080656 A1* | 4/2006 | Cain et al. | 717/174 |
| 2007/0033276 A1* | 2/2007 | Brockhoff et al. | 709/224 |
| 2007/0220510 A1* | 9/2007 | Bell et al. | 717/174 |
| 2008/0281958 A1* | 11/2008 | McKinnon et al. | 709/224 |
| 2009/0198801 A1* | 8/2009 | Waud et al. | 709/221 |

* cited by examiner

*Primary Examiner* — Tuan A Vu
(74) *Attorney, Agent, or Firm* — Womble Carlyle Sandridge & Rice, LLP

(57) ABSTRACT

A method, system, and computer readable storage medium for managing the deployment of software patch updates on a plurality of computers in an enterprise computer network during a patch cycle wherein each computer receives and installs periodic software patch updates automatically. An inventory is maintained of the computers in a central database that stores a status of each computer for each patch during the patch cycle. The computers are filtered into at least one filter group and a list of computers in the filter group is displayed along with the status for each patch. The status of each patch is verified and displayed for each computer in the filter group. A controlled software patch update is performed for each non-compliant computer in the filter group. A controlled reboot of each computer in the filter group is performed following the completion of the software patch updates for the patch cycle.

21 Claims, 16 Drawing Sheets

Monthly Patch Reboot Status Report

| | APART S/N | APART Domain Name | APART Patch Grp | BulletinID | LastEnforcementState |
|---|---|---|---|---|---|
| ALFNPSW07-OLD | BNB2771 | southern.com | Patch-IOC-Sun-0600 | UNVERIFIED | UNVERIFIED |
| ALFTNAPO2DV | CJT5D51 | socogencom | Patch-GDIS-Mon-NA | UNVERIFIED | UNVERIFIED |
| ALFTNAPO5 | HPVDK91 | socogencom | Patch-GDIS-Mon-NA | UNVERIFIED | UNVERIFIED |
| ALFTNAPO5DV | ESX-Production | SOCOGEN | Patch-GDIS-Mon-NA | UNVERIFIED | UNVERIFIED |
| ALFTNAPO5DV-OLD | FHT5D51 | socogencom | Patch-GDIS-Mon-NA | UNVERIFIED | UNVERIFIED |
| ALFTNAP06 | 3Q7QXB1 | socogencom | Patch-GDIS-Mon-NA | UNVERIFIED | UNVERIFIED |
| ALFTNAP07 | 8Q7QXB1 | socogencom | Patch-GDIS-Mon-NA | UNVERIFIED | UNVERIFIED |
| ALFTNAP30 | CSGMRC1 | socogencom | Patch-GDIS-Mon-NA | UNVERIFIED | UNVERIFIED |
| ALFTNAP30DV | 2VKXVC1 | socogencom | Patch-GDIS-Mon-NA | UNVERIFIED | UNVERIFIED |
| ALFTNAP31 | 7WGMRC1 | socogencom | Patch-GDIS-Mon-NA | UNVERIFIED | UNVERIFIED |
| ALFTNAP31DV | F06YVC1 | socogencom | Patch-GDIS-Mon-NA | UNVERIFIED | UNVERIFIED |
| ALFTNVW01 | 1BPDK91 | socogencom | Patch-GDIS-Mon-NA | UNVERIFIED | UNVERIFIED |
| ALFTNVW01DV | GVT4R21 | SOCOGEN | Patch-GDIS-Mon-NA | UNVERIFIED | UNVERIFIED |
| ALFTNVW02 | BPVDK91 | no information | Patch-GDIS-Mon-NA | UNVERIFIED | UNVERIFIED |
| ALGEPPE01 | JJ6V0F1 | southernco.com | Patch-GDIS-Mon-NA | UNVERIFIED | UNVERIFIED |
| ALLMDPE01 | 7QK70G1 | southernco.com | Patch-NA-NA-0000 | UNVERIFIED | UNVERIFIED |
| ALPLMAP31 | 6297WH1 | southernco.com | Patch-IOC-Sat-1900 | UNVERIFIED | UNVERIFIED |
| ALXAPAP16-OLD | 3XWTN81 | southernco.com | Patch-IOC-Sat-1915 | UNVERIFIED | UNVERIFIED |
| ALXAPAP18-NEW | ESX-Production | SOUTHERNCO | Patch-IOC-Fri-2000 | UNVERIFIED | UNVERIFIED |
| ALXAPAP24UA- | GK2BX01 | SOUTHERNCO | Patch-IOC-Sun-0100 | UNVERIFIED | UNVERIFIED |
| ALXAPAP76 | 18RTN81 | southernco.com | Patch-IOC-Sun-0600 | UNVERIFIED | UNVERIFIED |
| ALXAPBA20 | ESX-Production | southernco.com | Patch-IA-Sat-1900 | UNVERIFIED | UNVERIFIED |
| ALXAPBB14UA-OLD | 5MVB4G1 | southernco.com | Patch-IOC-Sat-2100 | UNVERIFIED | UNVERIFIED |
| ALXAPBC03 | 6VL2SF1 | southernco.com | Patch-IOC-Sun-0030 | UNVERIFIED | UNVERIFIED |
| ALXAPBT07 | 329LL81 | southernco.com | Patch-IOC-Sun-0030 | UNVERIFIED | UNVERIFIED |
| ALXAPBT08 | 98FPL81 | southernco.com | Patch-IOC-Sun-0030 | UNVERIFIED | UNVERIFIED |
| ALXAPBT11 | GXFQL81 | southernco.com | Patch-IOC-Sun-0030 | UNVERIFIED | UNVERIFIED |
| ALXAPBT12 | 20GQL81 | southernco.com | Patch-IOC-Sun-0030 | UNVERIFIED | UNVERIFIED |
| ALXAPBT20 | FXC2M81 | southernco.com | Patch-IOC-Sun-0030 | UNVERIFIED | UNVERIFIED |
| ALXAPCM01BL | 1YDZWG1 | batusers.southernco.com | Patch-PCD-Thu-1000 | UNVERIFIED | UNVERIFIED |
| ALXAPCM01TS | CN4TRF1 | southernco.com | Patch-I0S-Wed-1100 | UNVERIFIED | UNVERIFIED |

PATCH CYCLE MASTER RECORDS MANAGEMENT AND SERVER MAINTENANCE SYSTEM

TECHNICAL FIELD

The invention relates generally to updating computer server operating systems, and more particularly to methods for managing the software maintenance and rebooting of the operating system of a large number of servers.

BACKGROUND OF THE INVENTION

In a system with several thousand servers running the Microsoft Windows operating system, installing software updates and repairs (patches) to the operating system running on each server can be an enormous task. However, installing the patches is necessary in order to maintain the security and integrity of the computing environment. The current options for managing such a task are: (1) send Information Technology (IT) personnel to each machine to perform the operating system updates; (2) open the operating system to auto-updates from the vendor, and then resolve issues that result from patches that cause problems for installed business applications; (3) establish an operating system update service such as Windows Server Update Service (WSUS) system to auto-update the servers, but still resolve the potential conflicts with business software; (4) use a central configuration manager such as System Center Configuration Manager (SCCM) to manage the WSUS content. This fourth option offers more control over when the patches are sent out. In fact, both options 3 and 4 offer more control over the operating system's update path, but the difficulty arises when it is necessary to make absolutely sure that every computer in the system has had the latest security update to prevent access by the latest known intrusion.

There is no method that can guarantee that all machines will have the latest software updates, since it is always possible for someone to insert a machine into the network, potentially infecting every operating system in the network. But if a good inventory of computers on the network is kept up to date, then it is possible to make sure that every machine in the inventory is properly maintained.

SUMMARY OF THE INVENTION

Embodiments of the invention provide in a single tool, referred to herein as PatchMaster, the merged data of the computer inventory with the activity status on patches from SCCM, and provides the further ability to close the gap on any machines that were missed. It does this by managing the Windows Update Service on the servers to patch themselves from the WSUS in a very controlled manner. Finally and quite important, but not provided by any other tool, PatchMaster provides a seamless method to manage the reboot schedule of all of the servers in the system.

In exemplary embodiments in a Windows server environment, the PatchMaster tool is used in conjunction with Microsoft's System Center Configuration Manager (SCCM) application, a proprietary application called "Application Portfolio and Architecture Research Tool" ("APART"), and a merged SQL database that results from the two applications. The inventory for all servers is entered into the APART application at build time. SCCM performs the patch updates once a month and reports the status of each server during this patch update process. That data is merged with the APART server data to provide the domain, serial number, as well as the day/time and organization responsible to reboot the server after the update. PatchMaster takes this merged database, displays it in a useable fashion, and sorts and filters the information so that follow up patching for servers SCCM has missed can be performed from within the tool using a proprietary patch utility called "Security Patch Update Processor" and Microsoft's Windows Server Update Service (WSUS). PatchMaster also organizes the server data in such a way that servers can be remotely rebooted at a designated day and time. This total process is performed in a very controlled manner.

In an exemplary embodiment, a method, system, and computer program product are provided for managing the deployment of software patch updates on a plurality of computers in an enterprise computer network during a patch cycle wherein each computer receives and installs periodic software patch updates automatically. An inventory is maintained of the computers in a central database that stores a status of each computer for each patch during the patch cycle. The computers are filtered into at least one filter group and a list of computers in the filter group is displayed along with the status for each patch. The status of each patch is verified and displayed for each computer in the filter group. A controlled software patch update is performed for each non-compliant computer in the filter group. A controlled reboot of each computer in the filter group is performed following the completion of the software patch updates for the patch cycle.

BRIEF DESCRIPTION OF THE DRAWINGS

These and other advantages and aspects of the present invention will become apparent and more readily appreciated from the following detailed description of the embodiments of the invention taken in conjunction with the accompanying drawings, as follows.

FIG. 6 illustrates a user interface display of the results of a filter "Patch Group" selection in an exemplary embodiment.

FIGS. 7A-7B illustrate portions of a user interface display for filtering servers based on whether or not a filter has been selected for displaying server patch information.

FIG. 8 illustrates a user interface display of the results of a filter "Patch Group" selection and a context sensitive pop-up menu for creating reports and server lists.

FIG. 9 illustrates an exemplary monthly patch reboot status report that can be generated for a selected group of servers.

DETAILED DESCRIPTION

Figure 1:
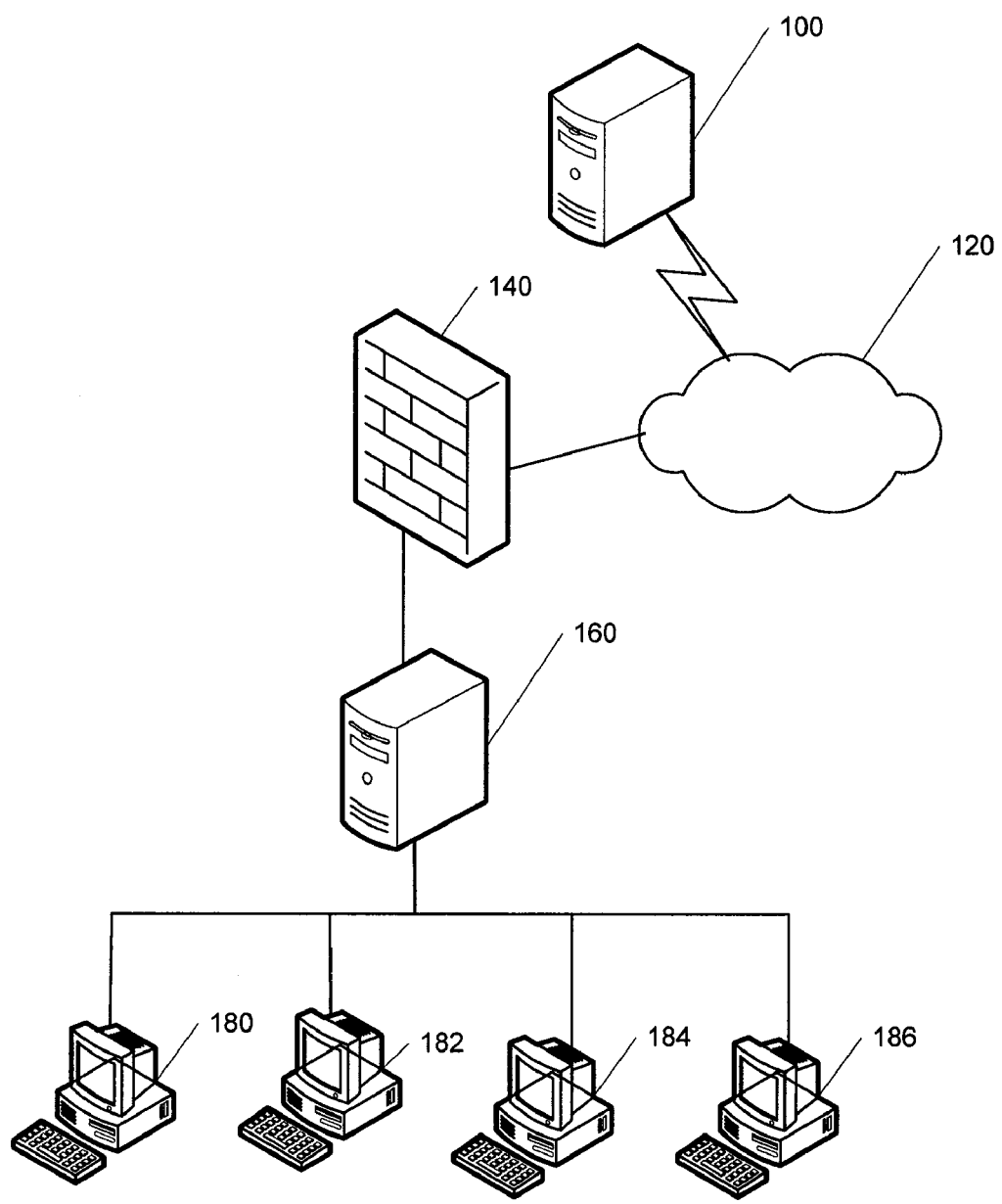
FIG. 1 illustrates a prior art single server scenario for distributing updates to client computers in a simple computer network using a Microsoft Windows Server Update Services (WSUS) server. This is the server component that is installed on a computer running a Windows Server 2003 operating system inside the corporate enterprise firewall.

The following description is provided as an enabling teaching of embodiments of the invention including the best, currently known embodiment. Those skilled in the relevant art will recognize that many changes can be made to the embodiments described, while still obtaining the beneficial results of the disclosed embodiments. It will also be apparent that some of the desired benefits of the embodiments described can be obtained by selecting some of the features of the disclosed embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

Embodiments of the invention are directed to a corporate enterprise environment that includes a large number of servers. The embodiments will be described herein in the context of an environment in which Microsoft server and client products are installed on the host computer systems, servers, workstations, and laptops of the corporate enterprise. However, the inventive concepts described herein are applicable to other operating system environments including Linux, Solaris, and VMWare, and other application software products that regularly issue security patches over the Internet. For an installed base of Microsoft software products, the invention makes use of the Microsoft Windows Server Update Services (WSUS) server. An enterprise can allow the WSUS server to maintain communication with Microsoft, which automatically downloads all released patches to the WSUS server. Each month, an enterprise representative (e.g., system administrator) approves patches that have been determined as acceptable by the enterprise and that should be installed on its machines.

Before describing the embodiments in detail, the Security Patch Update Processor and the APART utility will be described briefly. The Security Patch Update Processor is described in patent application Ser. No. 11/766,503, filed on Jun. 21, 2007. The APART application is described in commonly assigned published patent application US 2007/0033276, entitled "Application Portfolio and Architecture Research Tool." Both applications are incorporated by reference in their entireties herein.

The security patch update processor removes the need to have individual custom scripts created every month to handle the different security updates. Furthermore, the security patch update processor makes use of the internal Windows update service to allow each machine to perform a self-evaluation in conjunction with settings on the centralized WSUS server. The security patch update processor allows an enterprise to more closely manage when the Windows update process takes place using scripts. The security patch update processor is designed to be configurable and flexible to apply to different environments and needs. The Windows Server Update Services software is downloaded and installed on an enterprise server. Windows Server Update Services software maintains itself by automatically downloading all released software updates.

FIG. 1 illustrates a prior art single server scenario for distributing updates from server 100 via the Internet 120 to client computers 180, 182, 184, 186 in a simple computer network using a Microsoft Windows Server Update Services (WSUS) server 160 behind corporate firewall 140. System administrators can configure how client computers 180, 182, 184, 186 communicate with WSUS server 160 by using group policy or by scripting with the WSUS API.

The enterprise system administrator selects and approves the security updates to install on its machines. The security patch update processor sets the machines it runs on to get updates from the WSUS, then scans the machine for its requirements using the Windows Server Update Service, and optionally downloads and installs the required updates from the WSUS. The security patch update processor enables immediate updates to the machine it runs on providing an advantage over prior art processes for installing patches. This is especially important when enterprise policy requires that all affected machines be patched with updates within a set period of time. The security patch update processor also can be configured to automatically reboot, prompt for reboot or suppress reboot according to the needs of the machine type. The security patch update processor can take a large number of command-line settings, or can optionally use a configuration file to pass command-line arguments. In summary, the security patch update processor provides the ability to scan, download, and install patches which are enterprise-managed on a WSUS. The processing logic for the security patch update processor is described subsequently in this description.

The Application Portfolio and Architecture Research Tool (APART), disclosed in published application US 2007/0033276, is a web-based application that maps out a company's IT architecture with regard to applications, servers, and databases. More specifically, APART provides a library of information on the applications and servers used within a company. It provides contact information on applications, servers, and other infrastructure support areas used by the IT help desk and infrastructure management center of the company. This library of information on who supports applications, servers and other infrastructure areas or groups is referred to as "call groups" in the invention. In brief, APART can be used as a search engine for finding information on applications, releases of applications, names of support personnel for an application, servers, names of personnel who support a server, server leases, product deployments, secure socket layer (SSL) expirations, and call groups.

APART can be used by application portfolio managers to provide current information on the suite of applications supported by their groups to plan for upgrades and replacements. APART provides a record of server locations for each application, data base, etc. and is beneficial in determining impacted system and clients during server outages. The processing logic for APART is described subsequently in this description.

Figure 2:
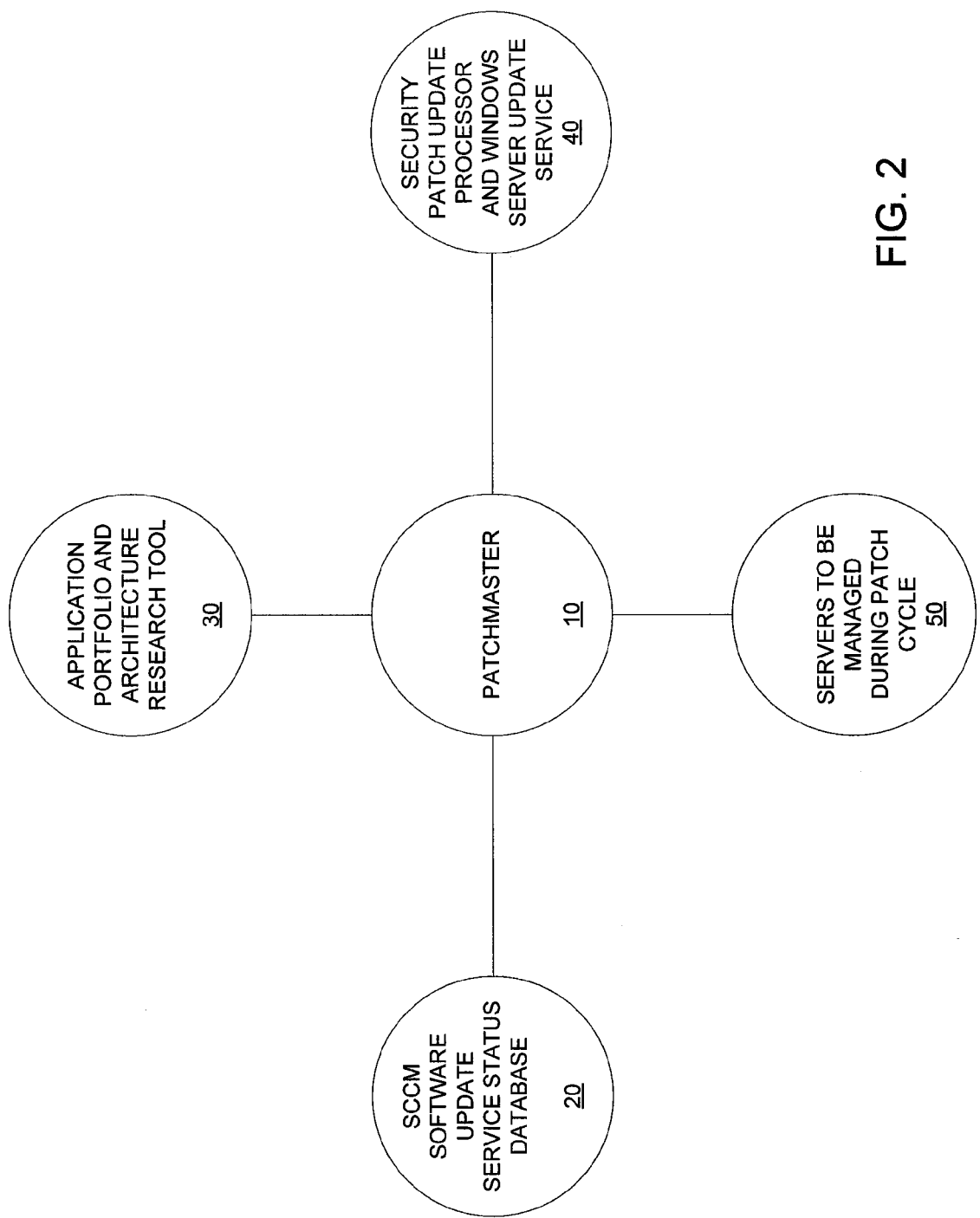
FIG. 2 illustrates the relationship among a plurality of commercially available and internal applications that are interfaced with the PatchMaster application to manage software updates in an exemplary embodiment.

FIG. 2 illustrates the relationship among a plurality of commercially available and proprietary applications that are interfaced with the PatchMaster application to manage software updates in an exemplary embodiment. The PatchMaster application 10 is shown as the hub of the architecture. The spokes include the SCCM software update service 20, APART application 30, Security Patch Update Processor and WSUS applications 40, and servers to manage during patch cycle 50.

Upon running the executable, PatchMaster 10 will load in a full screen manner. PatchMaster 10 is configurable via a configuration file for such things as database connect strings, WSUS locations and settings, remote launch settings and email notification settings for the reboot process. Other information such as override group settings are also stored in the configuration file.

PatchMaster 10 connects to the database using the connect string stored in the configuration file. PatchMaster loads all of the data into an internal array for quick manipulation. Once loaded, the data is sorted into filter groups based upon "Patch Group," "Boot Group," or "Boot Day." Each filter is accessible via a tool bar button at the top of the user interface display. Each filter displays the number of servers contained in that particular filter. Each individual filter has a check box. By checking one or more filters and selecting the Filter button, the data corresponding to the filter(s) selected will be displayed in the right hand panel of the user interface display.

Each particular filter can be further filtered to display only one server instead of showing the server name for each patch which must be tracked. Other filter extensions include showing only servers which are non-compliant concerning patch updates, and showing servers which are in a pending reboot status.

Once the correct list of servers is displayed in the right-hand panel of the user interface display based upon the filter (s) selected, these servers may be acted upon in a batch manner. The actions available for selection include the following: (1) confirm patch status, (2) perform the patch, or (3) boot the server.

Each server listed in the right-hand panel of the user interface display also has a checkbox. This checkbox is used to override the current patching/booting condition of the server as listed in APART application 30. Checking the box will allow the user to create another patch/boot group based upon the day/time and organization responsible for the patch/boot of that server. This will remove the checked server from the current patch/boot group filter so that it is affected separately from the rest of the servers in that group. PatchMaster 10 can create a flat file list of servers based upon a group filter selection.

This list can be used to perform a batch process outside of PatchMaster. PatchMaster 10 also can create a HyperText Markup Language (HTML) report based upon the servers and their status as delineated in the right-hand panel of the user interface display. Individual servers can be added to a group manually by adding to a group's list in the right hand panel of the user interface display.

A list of servers can be imported into PatchMaster 10. In this case, PatchMaster 10 will compare the list to its internal array and merge the server information from APART application 30 and SCCM application 20, displaying it in the right-hand panel of the user interface display. PatchMaster 10 does not store this display. However, it can be acted upon by the same functions as confirm, perform patch or reboot. PatchMaster 10 can also run a report on the status of these servers. If a server is not found in the internal database, it will simply be displayed without APART 30 or SCCM 20 data and allow the utility functions to be performed on it.

PatchMaster 10 includes several files or modules including executable, configuration, and dynamic link library (DLL) files. These executable, configuration, and DLL files must reside together in a folder. PatchMaster 10 is launched by double clicking or otherwise executing the PatchMaster.exe file. The PatchMaster.cfg file contains the customizable configuration data. This file should be edited to reflect the appropriate information.

PatchMaster 10 must be run by authorized users using credentials having the correct rights to patch, reboot, start/stop services and/or schedule a task on the servers which are contained in the database. Upon launching, depending on the number of servers and patches involved, PatchMaster 10 will take a few seconds to load. As a simple example, in a month with ten (10) patches needing to be applied to 2000 servers, PatchMaster 10 may contain up to 20,000 records. In a case such as this, it may take up to 15 to 20 seconds to load all of the data. Therefore, since PatchMaster 10 can consume between 40 and 60 MBs of memory in this example, it is important that the computer machine on which PatchMaster 10 is installed has adequate memory and page file capability.

Figure 3:
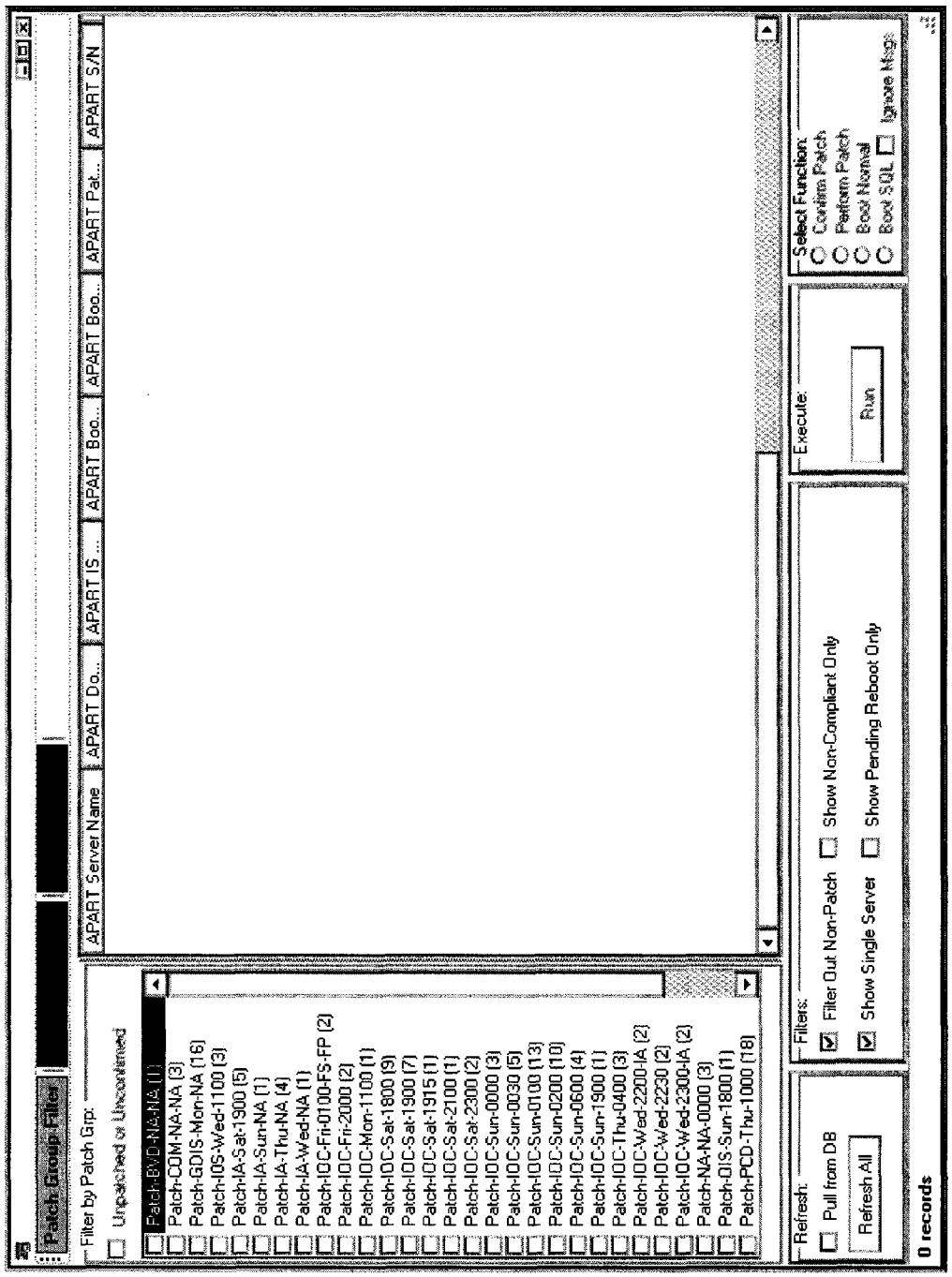
FIG. 3 illustrates a user interface display for filtering servers by "Patch Group" in an exemplary embodiment.

FIG. 3 illustrates a user interface display for filtering servers by "Patch Group" in an exemplary embodiment. PatchMaster 10 displays the currently logged on user in the upper left-hand corner of the user interface display. When PatchMaster 10 first comes up, it defaults to displaying the filter groups based on the APART Patch Group. Above the "Filter by Patch Group" column are toolbar buttons offering the main filter capabilities that include "Patch Group," "Boot Group," and "Boot Day" filters.

Figure 4:
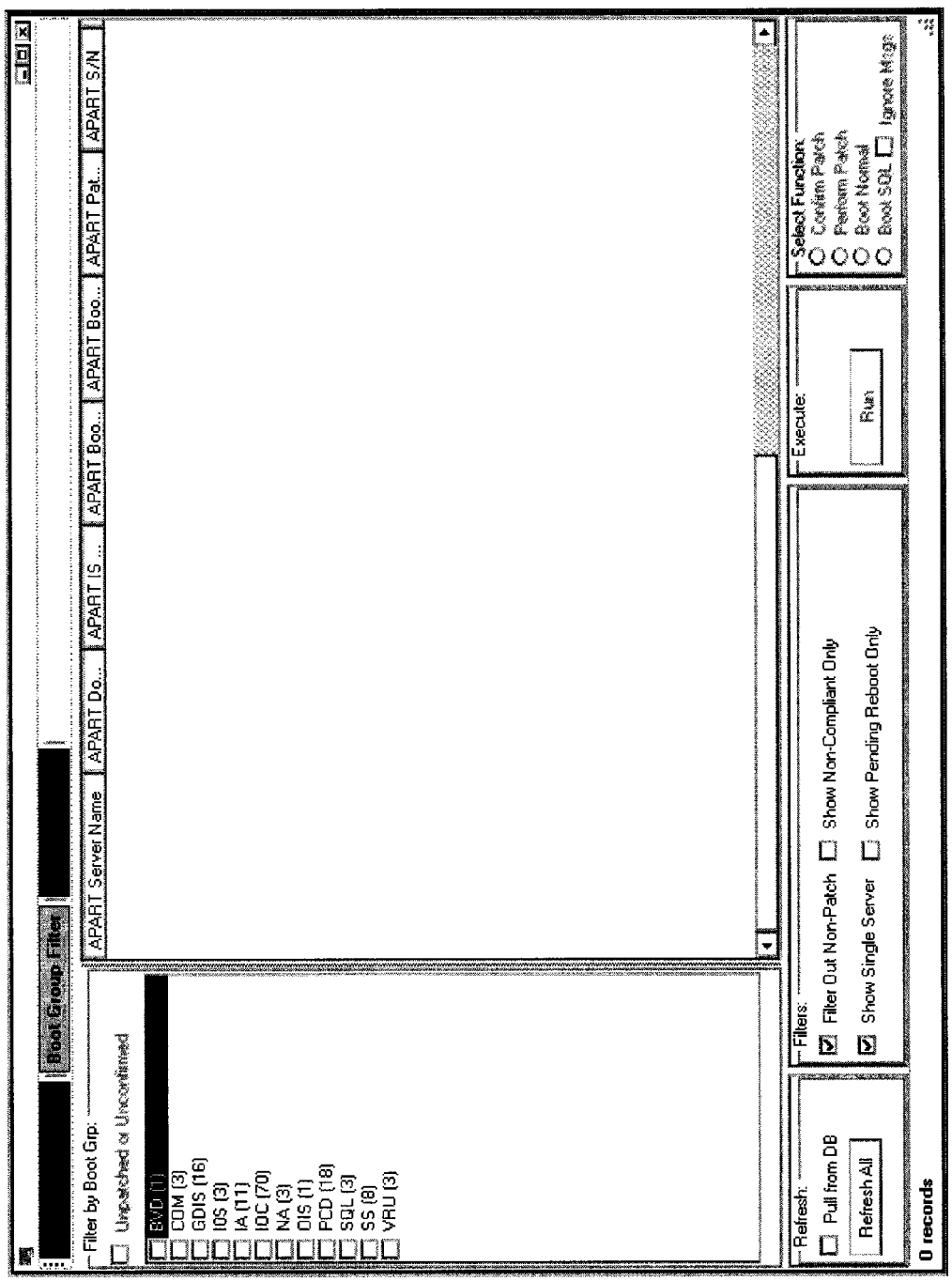
FIG. 4 illustrates a user interface display for filtering servers by "Boot Group" in an exemplary embodiment.
Figure 5:
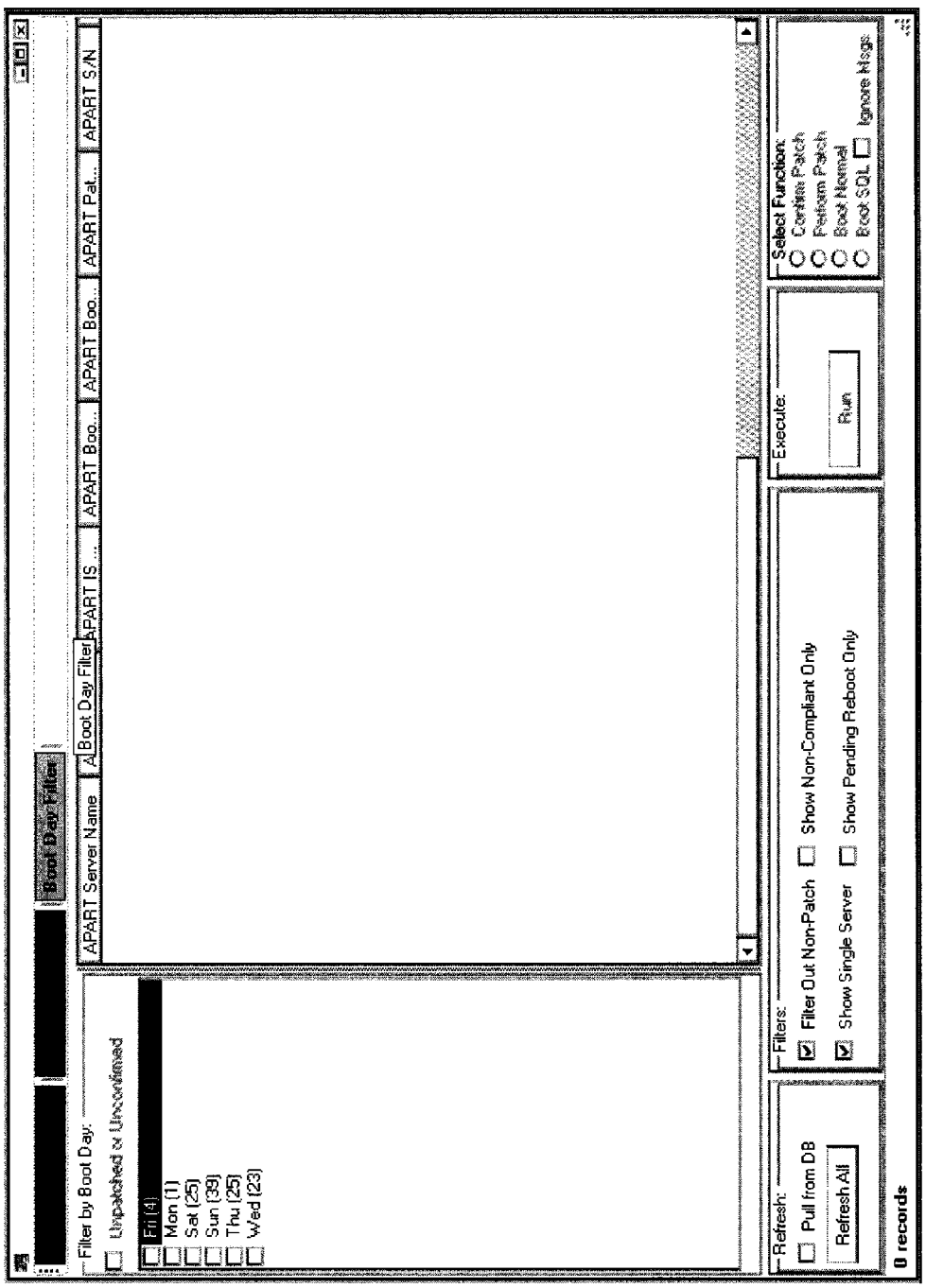
FIG. 5 illustrates a user interface display for filtering servers by "Boot Day" in an exemplary embodiment.

The "Patch Group" filter is a list created by PatchMaster 10 based upon an acronym representing the responsible organization, and the day and time of the reboot. Selecting the "Boot Group" filter will display a filter listing of the organizations names or acronyms responsible for the server status. FIG. 4 illustrates a user interface display for filtering servers by "Boot Group" in an exemplary embodiment. Selecting the "Boot Day" filter will display the days that the servers are to be rebooted. FIG. 5 illustrates a user interface display for filtering servers by "Boot Day" in an exemplary embodiment. In FIGS. 3-5, the number of servers affected by each filter in the group is displayed parenthetically to the right of the filter name.

Figure 6:
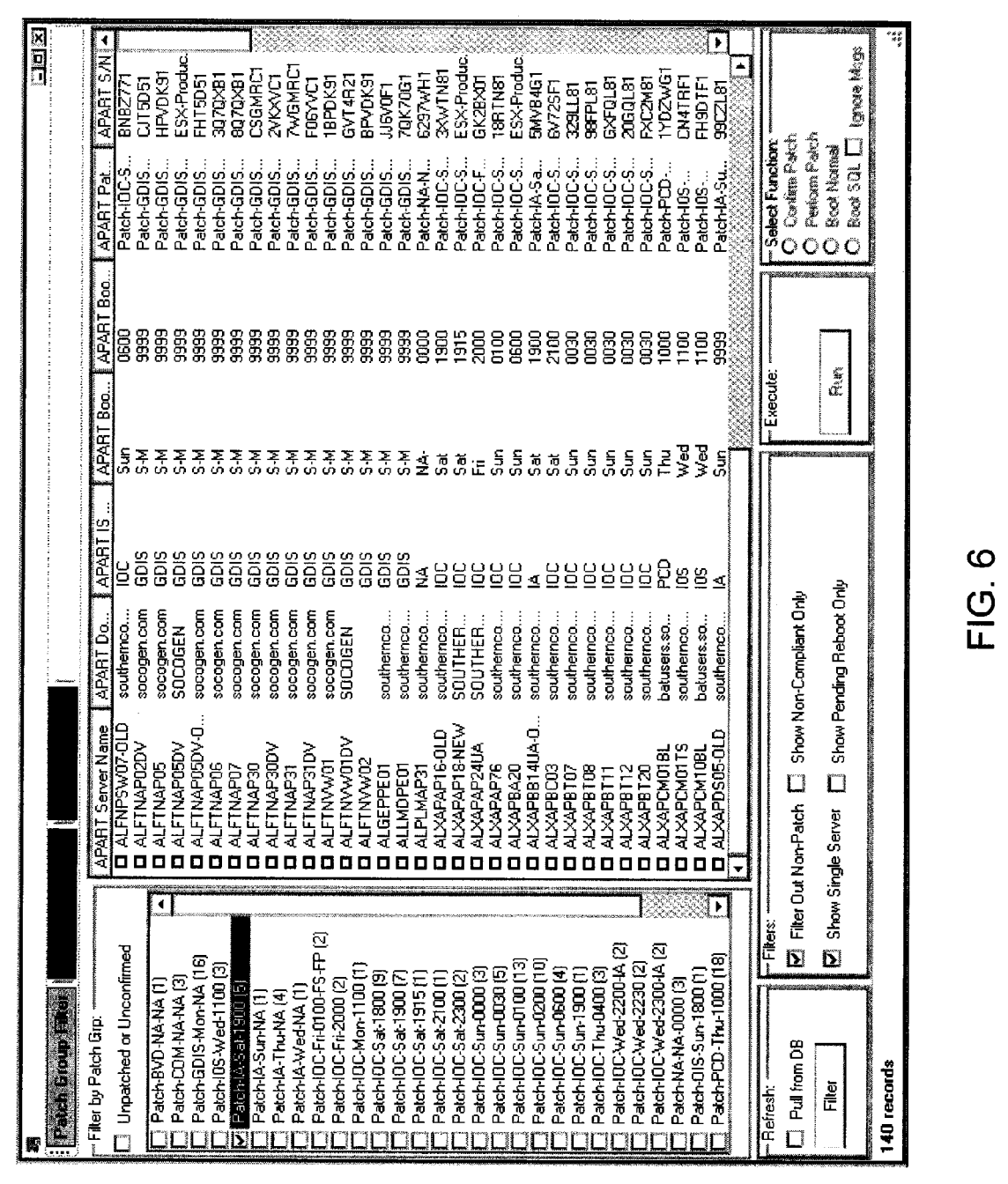

FIG. 6 illustrates a user interface display of the results of a filter "Patch Group" selection in an exemplary embodiment. As illustrated in FIG. 6, by using the "Patch Group" filter (or another filter), the user can select the checkbox for one or more of the filters, and the servers included in that filter or set of filters will be displayed in the right-hand panel of the user interface display when the "Filter" button, located on the bottom left of the user interface display is selected.

In the example shown in FIG. 6, the filter group "Patch-IOC-Sun-1900" was selected which indicates that the group should have 25 servers. However, because there are ten patches to be confirmed for this particular month, each server is displayed multiple times depending on how many patches are required for it individually. Thus at the bottom, left hand corner of the user interface, the total number of records for the selected patch group is displayed. While the view shown in FIG. 6 depicts the server/patch status relationship, this view is not always best for every task which could be undertaken. There are other checkboxes in proximity to the filter button in the bottom left-hand corner of the user interface. Each of these checkboxes will modify the manner in which selection of the "Filter" button displays the data. One other checkbox is the one above the Filter list which is labeled "Unpatched or Unconfirmed."

One of the checkboxes is labeled as "Pull from DB" checkbox. When PatchMaster 10 is first loaded, the "Pull from DB" checkbox may be checked already, then once it has completed loading the database, it will become unchecked. When this box is checked and the "Filter" button is selected, the application will pull the latest data from the SQL database server. When this box is unchecked, PatchMaster 10 will continue to use the data pulled from either the initial or last database pull.

The "Unpatched or Unconfirmed" checkbox above the filter list will cause the filter to only show servers with an "Unverified," "Enforcement State Unknown," or "Failed to Install Updates" status in the "Last Enforcement" column of the server list.

Figure 7A:
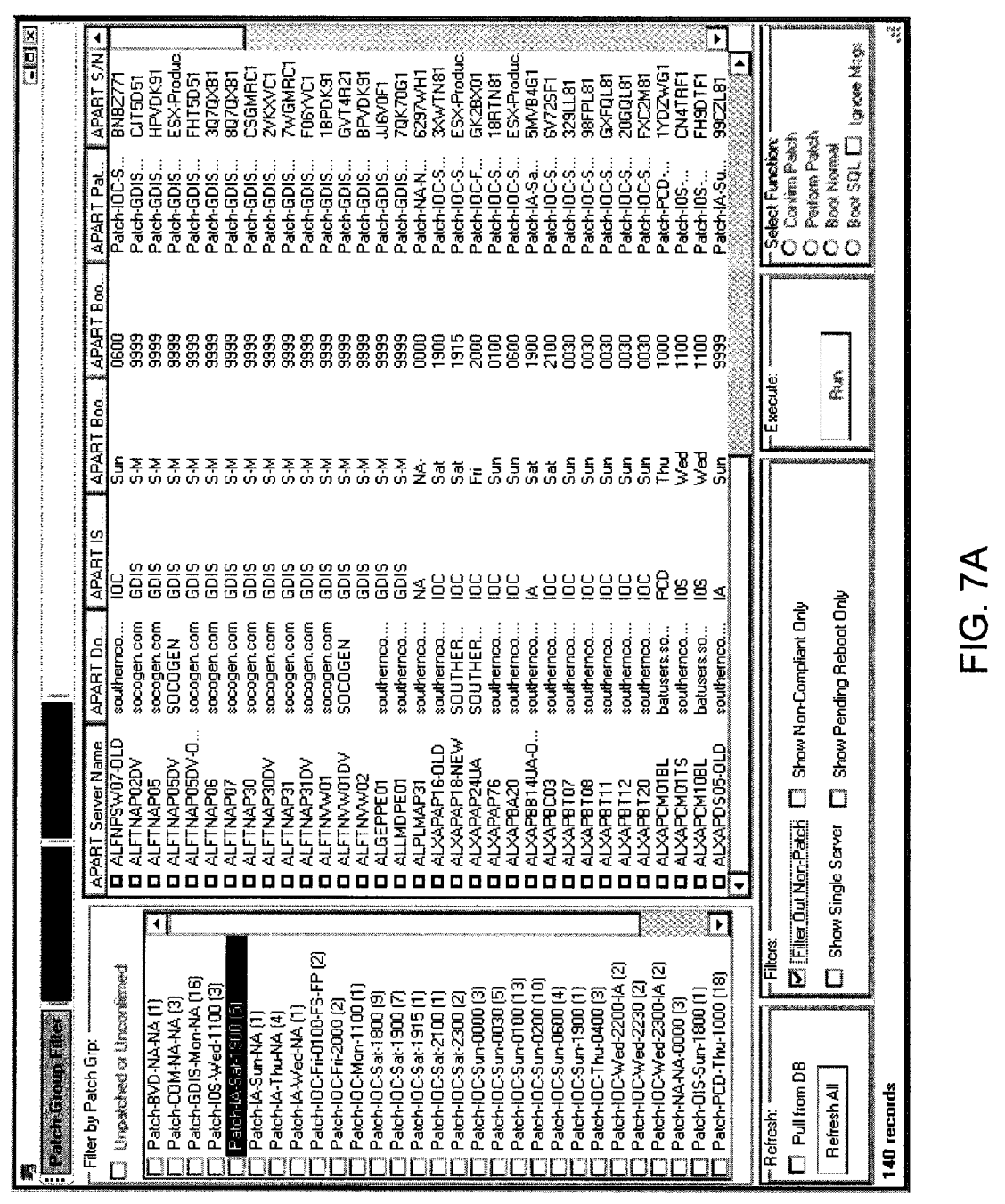
Figure 7B:
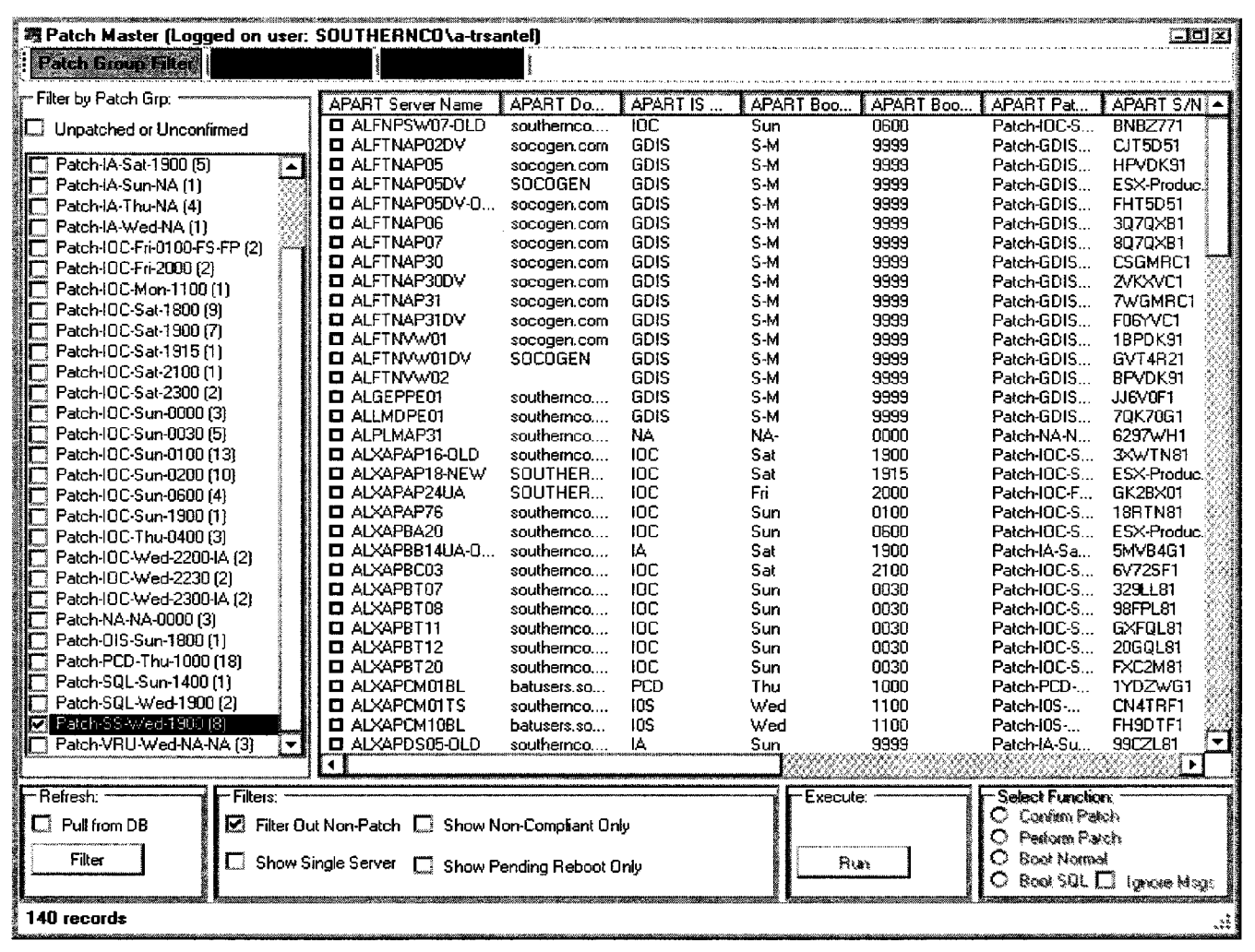

As illustrated in FIG. 7A, near the bottom left corner of the user interface for filtering servers, the text in the "Refresh" button varies according to whether or not a filter in the list is checked. If no filter is selected and the Filter button indicates "Refresh All," PatchMaster 10 will then display all server information in the right-hand panel of the user interface. All of the other filter buttons located in proximity to this button on the user interface will apply in this case, as well as when a particular filter or set of filters has been selected. Selecting at least one filter will change the text in the button to say "Filter," as illustrated in FIG. 7B. In this case, all of the information for all of the servers in that filter will be displayed. This is the best view for monitoring the status of all patches for these servers.

In FIGS. 7A-7B, the top left checkbox in the filter box located adjacent to the "Filter button" is labeled "Filter Out Non-Patch." This checkbox is checked by default. This checkbox causes servers which have been assigned to a group with the term "donotpatch" or "autoupdate" in the APART Patch Group name to be removed from patch processing. Since none of these servers should be treated with patches or reboots they are removed from any processing by default. The user removes the check from the checkbox and selects the "Filter" button to view a list of these servers.

Figure 8:
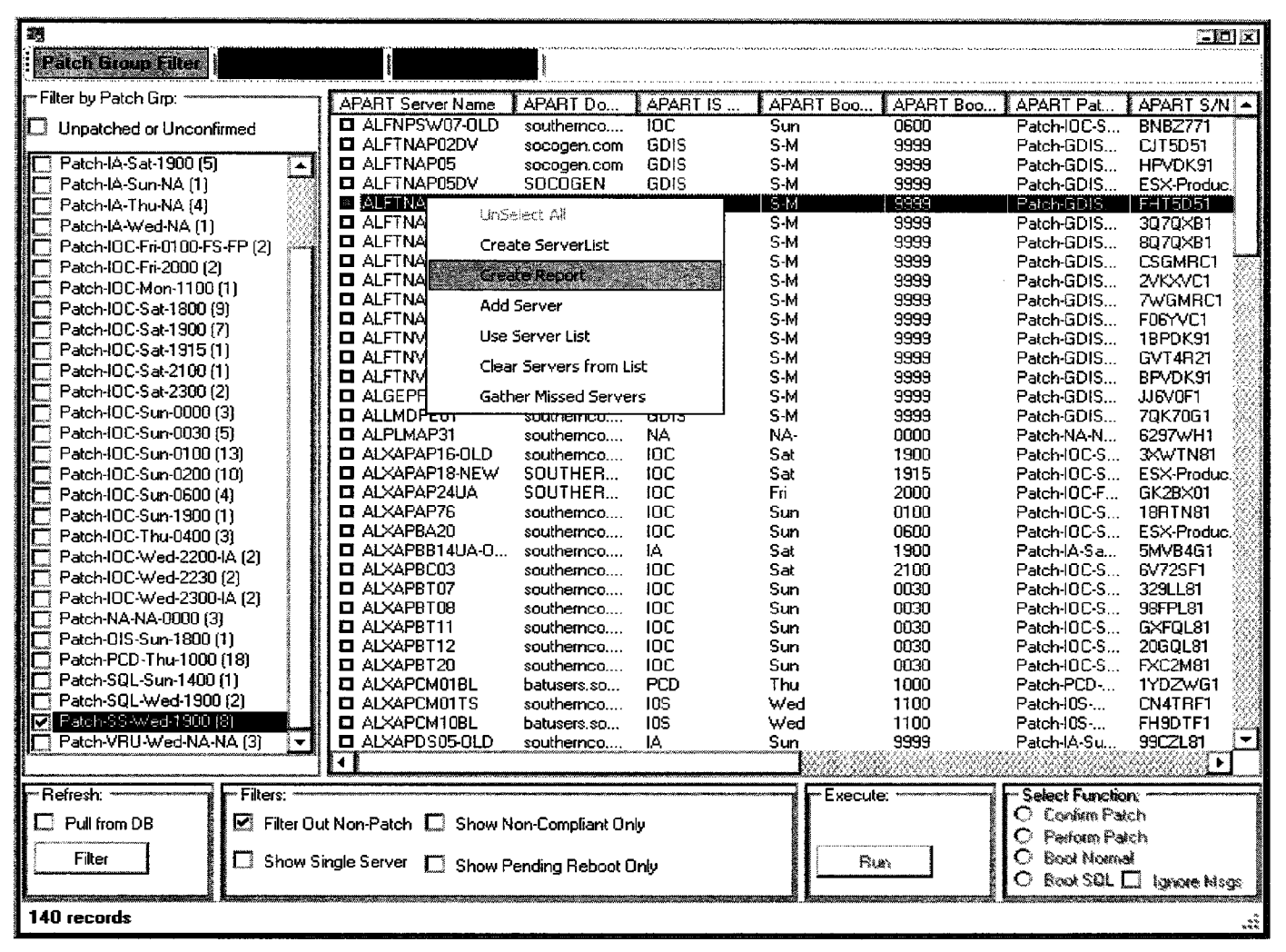

During the patch cycle, several activities will take place at different times and frequently involving multiple users. User preferences may determine how the filters are used. For example, a user may initially want to display all non-compliant servers assigned to a particular organization within the enterprise. The user can either use a "Boot Group" filter or select all of the "Patch Group" filters that apply to the particular organization. The user selects the "Filter" button to display the servers. This will show the status of the SCCM Patch Update process for each patch in the "Last Enforcement" column. A report of status of this group of servers can be run at this time by right clicking in the right-hand panel to display the context sensitive menu. FIG. 8 illustrates a user interface display of the results of a filter "Patch Group" selection and a context sensitive pop-up menu for creating reports and server lists. Selecting "Create Report" on the context sensitive menu will cause an HTML report to be generated for this set of servers. FIG. 9 illustrates an exemplary monthly patch reboot status report that can be generated in this manner.

In another example, the user may want to attempt to patch the servers which were not successfully updated by SCCM 20. In this case, the user selects the filter(s) in the filter list and checks the checkbox in the box next to the Filter button that is labeled "Show Non-Compliant Only." Then, by selecting the "Filter" button, PatchMaster 10 will only display the servers that are currently not compliant for the required patches. At this time, the user can either select to confirm if the patches have been installed, or actually perform the patching.

Figure 10:
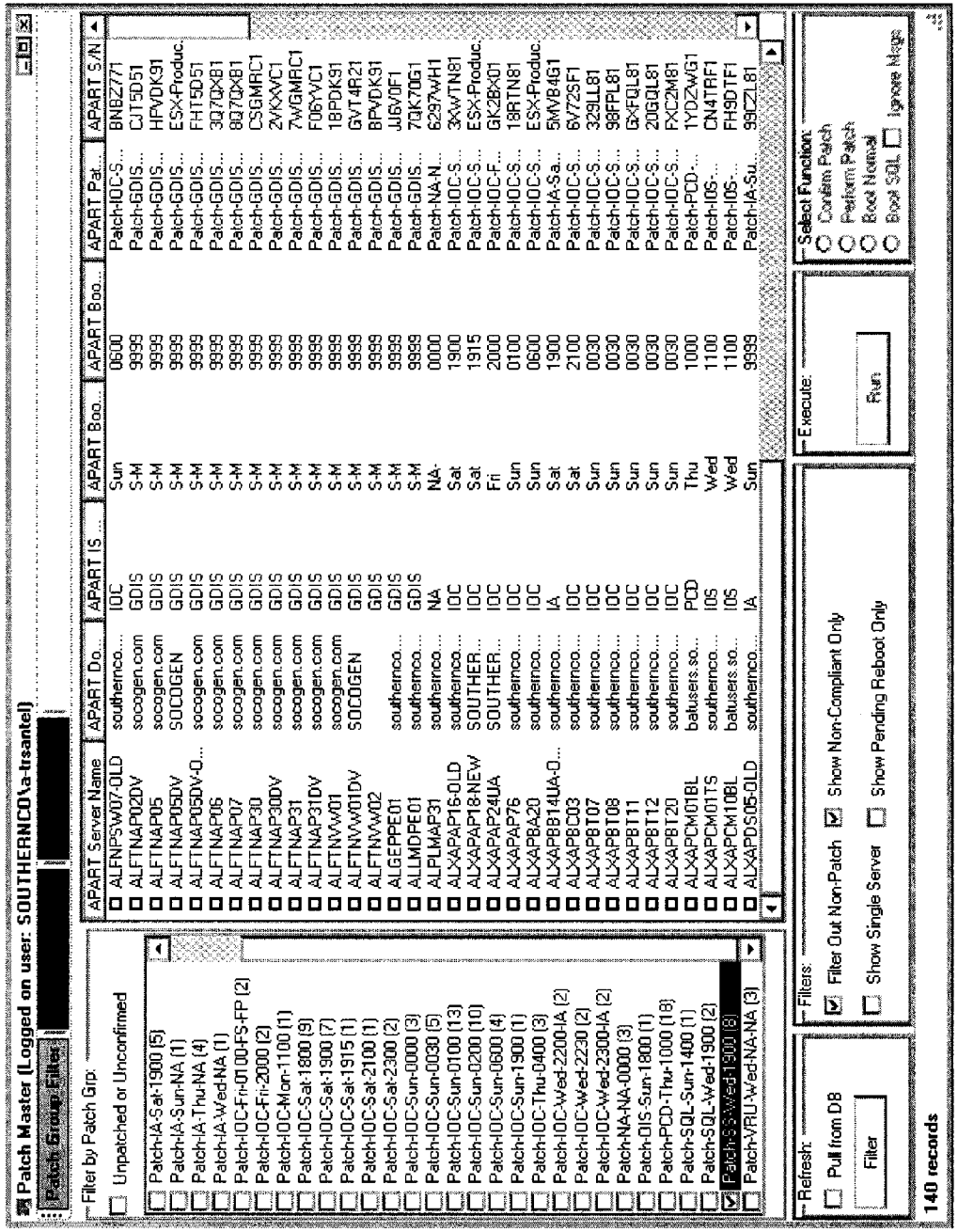
FIG. 10 illustrates an exemplary user interface in which only non-compliant servers in the group are displayed.

To display servers that are non-compliant for the required patches, the user checks the filter group(s), selects the "Show Non-Compliant Only" checkbox, and clicks the "Filter" button. This will display only the non-compliant servers in that group. FIG. 10 illustrates an exemplary user interface in which only non-compliant servers in the group are displayed.

When servers are displayed in the server panel, the "Select Function" box is enabled. The "Select Function" box has three options: (1) "Confirm Patch," (2) "Perform Patch," and (3) "Boot." The user can only select one option at a time.

Selecting an option, such as "Perform Patch," will cause an "Arm Scan" checkbox to appear. This checkbox is a safety precaution to prevent unwanted activities from being initiated against a large number of servers. Checking this box will cause the "Run" button to appear. Selecting the "Run" button will begin the process that goes to each server to run a patch update against the WSUS 40. The same process also applies to the "Confirm Patch" and "Boot" options. The only difference is that, for the boot process, the user may want to select the "Show Single Server" checkbox. If they are following a process where all servers in the list are rebooted regardless, they can use the list as it is or they can also use the "Show Pending Reboot Only" checkbox. If the "Last Enforcement" column indicates "Compliant," it does not mean that the server has been rebooted unless the patch in question actually requires a reboot. In this case, if the patch has been applied and the server has not been rebooted, the "Last Enforcement" column will show "Pending system restart." For this reason, if the process includes a monthly reboot on servers regardless, it is appropriate to simply apply the reboot to all servers in the list. In most cases, however, patches do require a reboot and it is easy to discern which servers have not been successfully rebooted by selecting the "Show Pending Reboot Only" checkbox.

Verifying Patch Status

Figure 11:
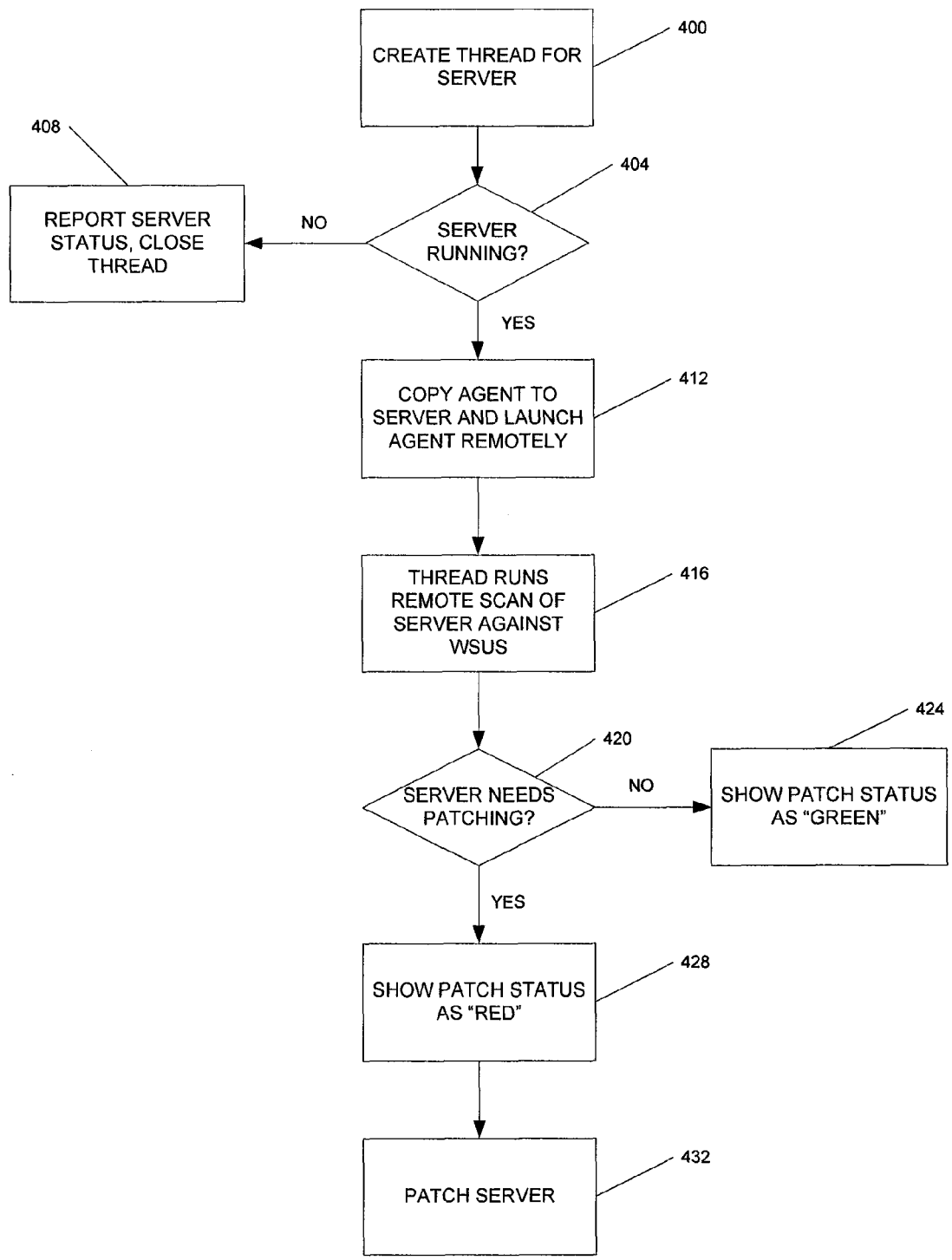
FIG. 11 illustrates processing logic for verifying patch status in an exemplary embodiment.

FIG. 11 illustrates processing logic for verifying patch status in an exemplary embodiment. In all cases, when the "Last Enforcement" column contains "Compliant" for a particular server, SCCM 20 has deemed that this server is up to date with this patch and no other action is required. At different times during the patch cycle, this status can be checked according to various filters or group filters or against the entire database by not applying any filters and selecting the "Filter/Refresh All" button. Once the desired servers are displayed along with their status, the user can right click on the server list panel and select "Create Report" from the context menu. At any time, the user can also add the "Show Non-Compliant Only" filter to any other filter selection criteria to narrow the list to only those servers which have not been patched.

If there is any doubt on the part of the user concerning the SCCM status messages, PatchMaster 10 has the ability to run a patch confirmation process on all servers listed in the right-hand panel of the user interface display.

The process for verifying patch status is as follows:

1. A separate thread is created for each server which stays with that server until the final status is received (step 400).

2. Each thread begins by checking that the server is alive and online (step 404). It does this by opening the Service Control Manager and checking the status of the Server service. If the Server service is not in a running state or PatchMaster 10 is unable to open the Service Control Manager of the server, it reports that status in the "PM Update Status" column of the PatchMaster user interface form, closes the thread and discontinues service for that server (step 408). All other server threads will continue to run.

3. PatchMaster 10 will copy a small agent to the server named, PMSrv.exe to C:\Windows\Temp and will launch the agent remotely (step 412). The policy, RunRemoteExe, must be set to allow this operation. Furthermore, if firewalls are in place, exceptions must be made for the Transmission Control Protocol (TCP) ports established for this process in the configuration file. The default port is 8085.

4. The thread will then run a remote scan of the server against the WSUS 40 to determine if the server is in need of patching (step 420).

5. The status of each patch will be shown for the server in either red, if the patch is still required (step 428), or green, if the patch status is up to date (step 424). The server is then patched as indicated in step 432.

Patching Servers

Figure 12:
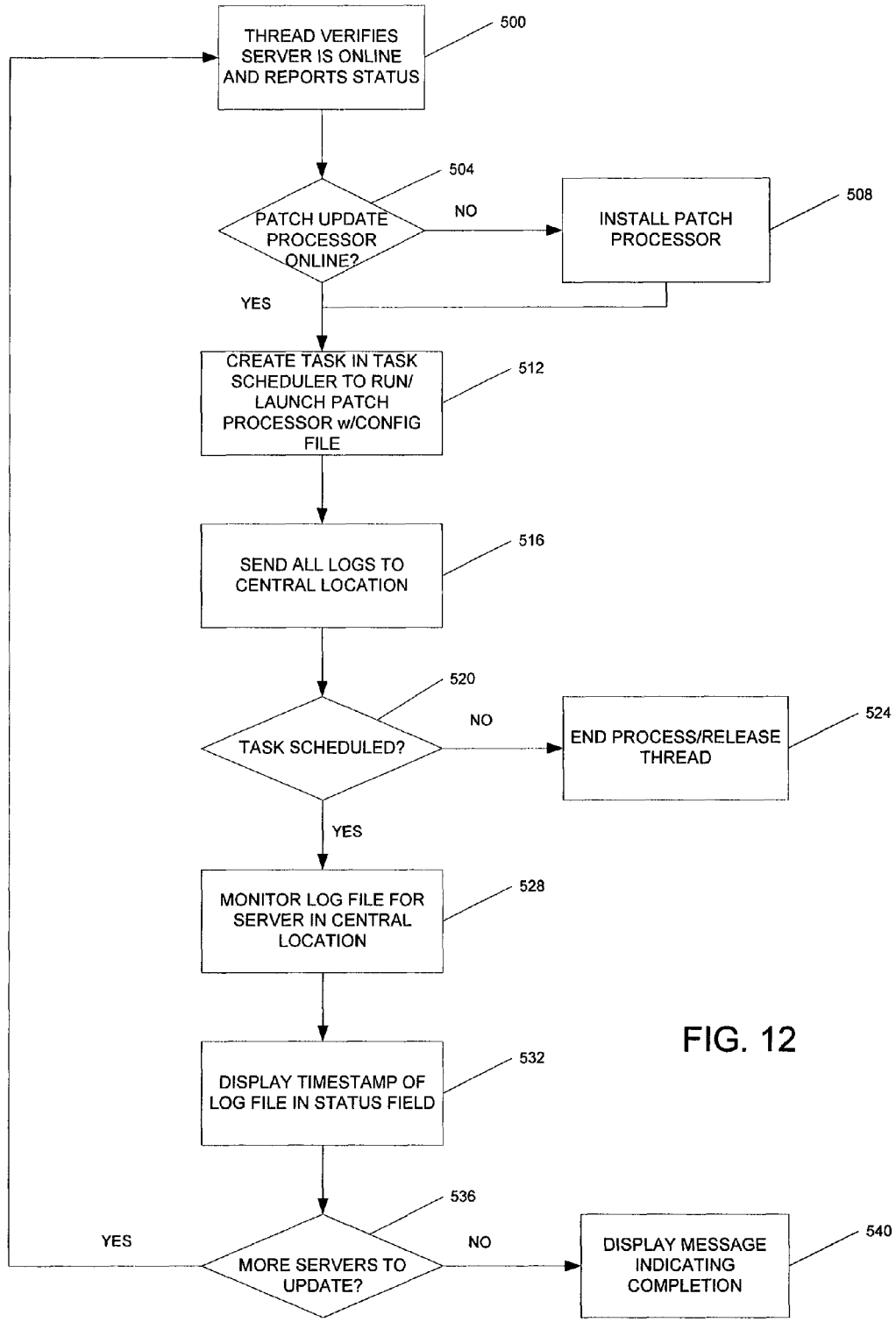
FIG. 12 illustrates processing logic for patching servers in an exemplary embodiment.

FIG. 12 illustrates processing logic for patching servers in an exemplary embodiment. Though SCCM 20 is capable of patching a large number of servers, there are still occasions where some servers get missed for various reasons. These missed servers can be handled by PatchMaster 10 in the following way:

The user selects the group filters to check.

The user selects the "Show Non-Compliant Only" checkbox.

The user may also check the "Show Single Server" checkbox to show the largest number of results in the window display (not necessary).

The user selects the "Filter" button to display servers.

With servers listed in the right-hand panel of the user interface display, the user selects the "Perform Patch" radio button.

The user selects the "Arm Scan" checkbox when it appears and when the user is ready to continue.

Once the "Run" button becomes enabled, the user may click it to begin the server patch process for the missed servers.

Once the patch process has begun, the PatchMaster user interface form will be unresponsive until the patch process has been completed. In the display, the user will see the activity taking place. During this process, PatchMaster 10 creates a separate thread for each server. Each thread stays with the server until the entire process for that server is complete and then relinquishes itself. All status messages during this process will be displayed in the "PM Update Status" column in line with the server for which the threaded operation is running.

During the server patch process, each thread will verify that the server is online and report that status (step 500). If the server is not online, the server will relinquish the thread at this point and not continue. The thread will check to see if the internal Security Patch Update Processor application is installed on the server (step 504). If it is not installed, the thread will install it (step 508). If the thread is unable to install the Security Patch Update Processor application, then the thread will report the status "Patch Software Not Found!!" and discontinue, releasing the thread. All other server threads will continue to run.

Next, the thread will create a task in the Task Scheduler to run once at the current time to launch Security Patch Update Processor using a special configuration file to run as a background process (step 512) and send all logs to a predefined central location (step 516). The thread will also use an encrypted user ID and password designated for this job.

PatchMaster will display the status of success or failure in scheduling the task (step 520). If the "Task Msg:" is other than successful, the server patch process will end and the thread will be released (step 524). If the task is successfully created, the thread will then begin to monitor the log file for that server in the central location (step 528). If the log file is found, it will display the timestamp of the log file in the status field (step 532).

During the entire process PatchMaster opens an Explorer window to the location of the central log file to show the logs as they are being created. The Microsoft log tool, SMSTrace 32, can be used to monitor these log files live. Once all servers have completed the update process (step 536), a message box will popup to display the message "Patch Update Scheduling Process has been completed" (step 540).

Rebooting Servers

Figure 13:
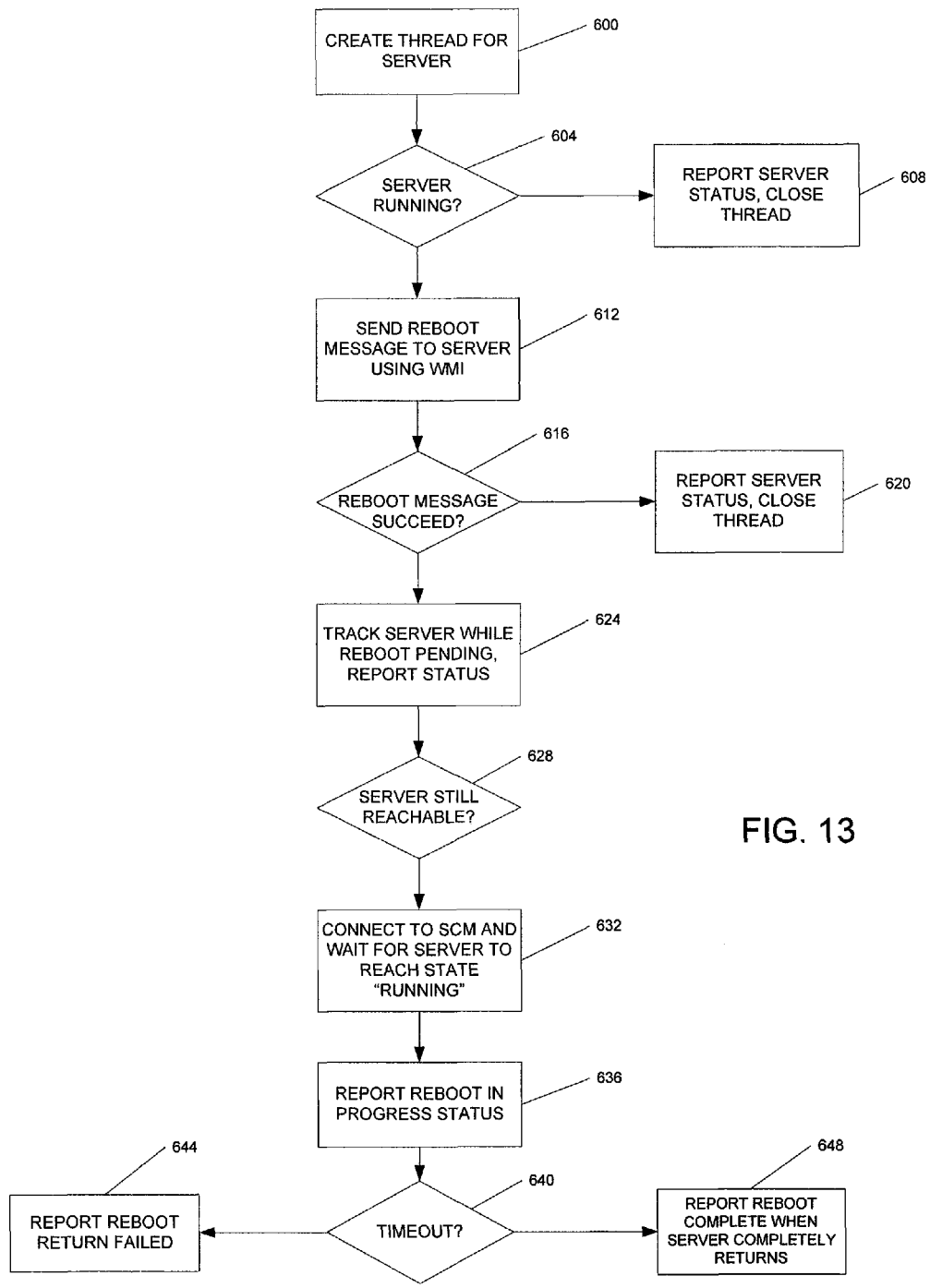
FIG. 13 illustrates processing logic for rebooting patches servers in an exemplary embodiment.
Figure 14:
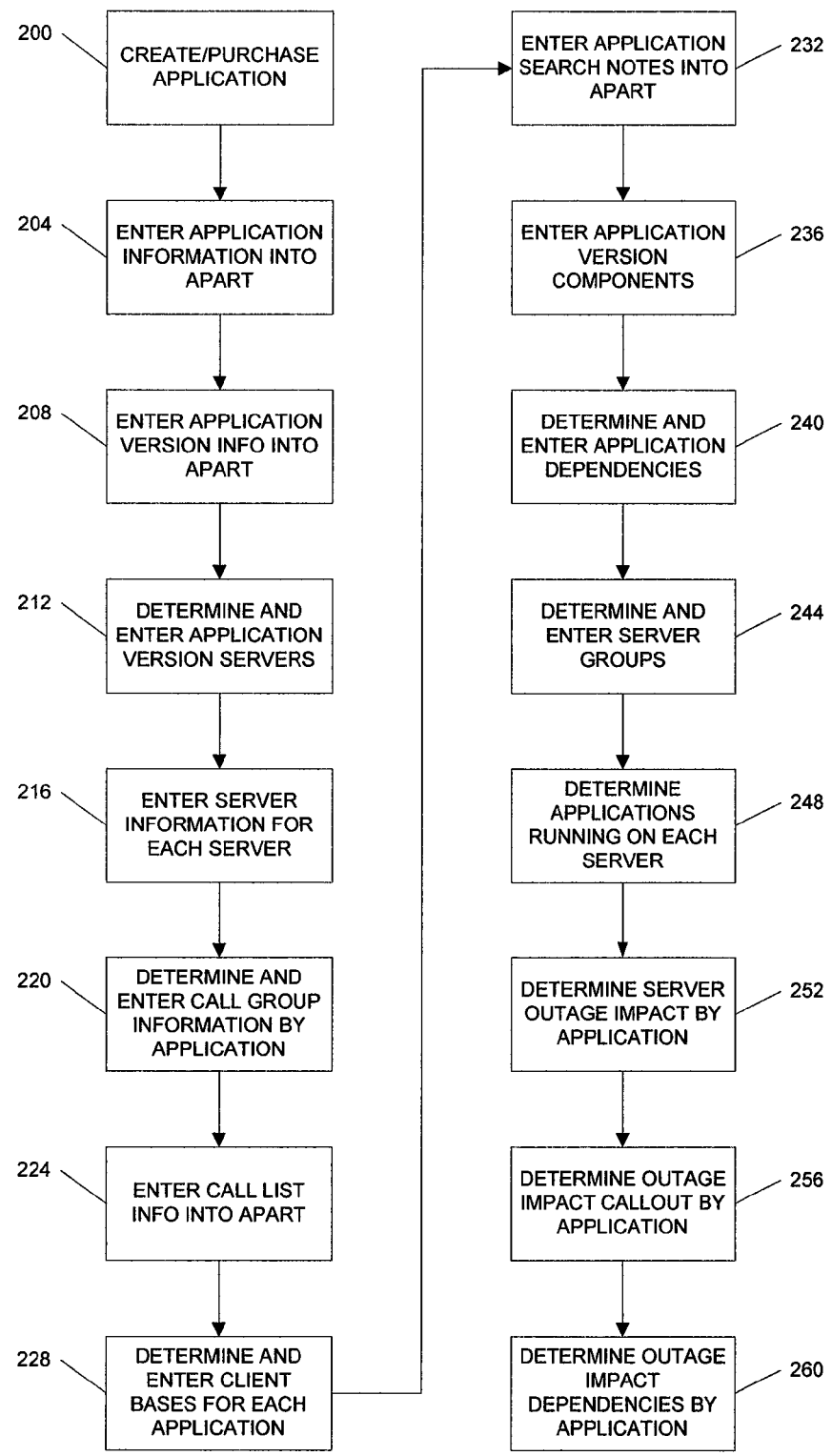
FIG. 14 illustrates processing logic for the APART system in an exemplary embodiment.
Figure 15:
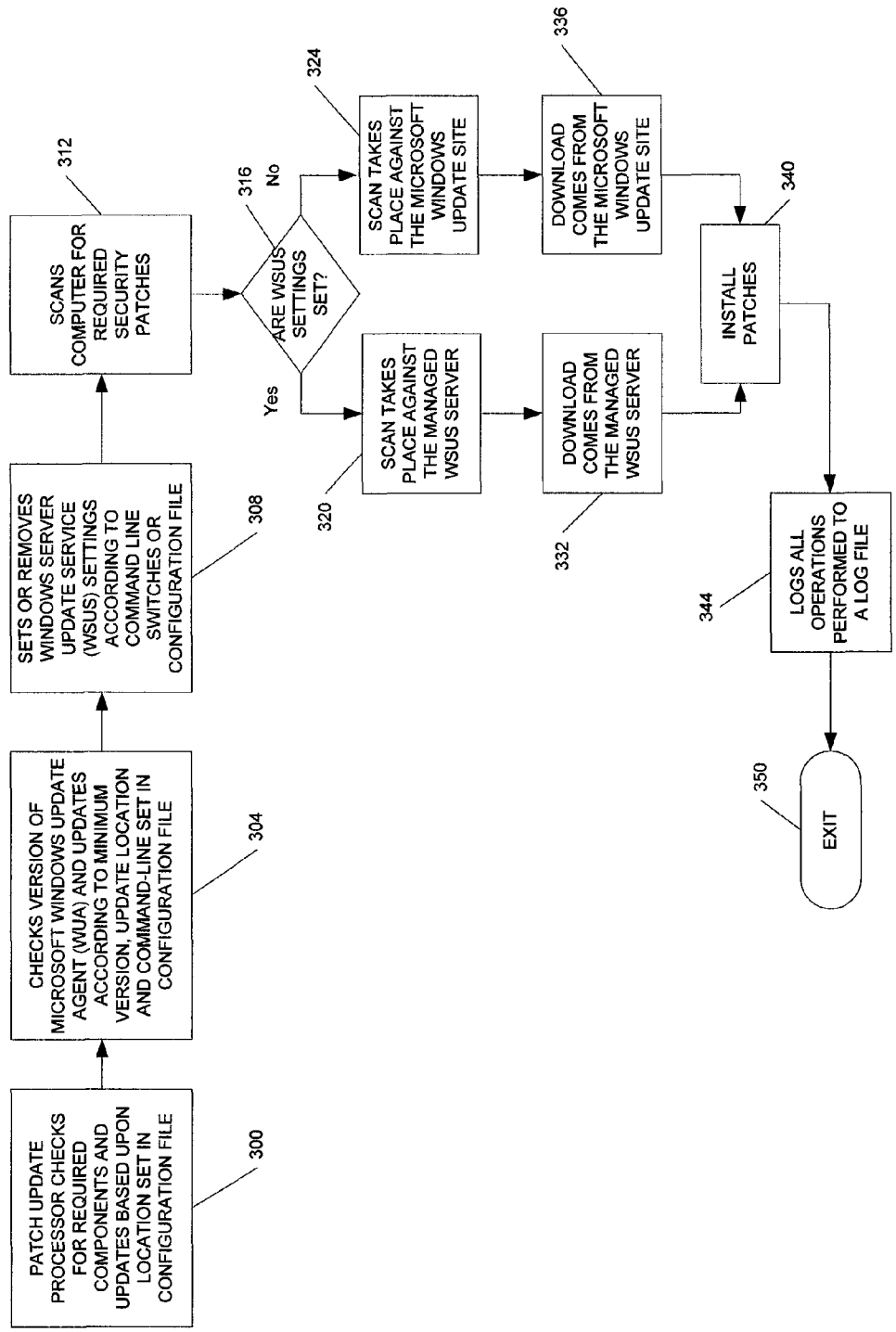
FIG. 15 illustrates processing logic for the security patch update processor in an exemplary embodiment of the invention.

One of the primary functions of PatchMaster is to submit and track the reboot function on a large number of servers. FIG. 13 illustrates processing logic for rebooting patched servers in an exemplary embodiment. The following is the process for rebooting patched servers:

The user selects filters including the added filter "Show Single Server." With servers in the right-hand panel, the user selects the function "Boot." When the "Arm Boot" checkbox appears, the user selects the checkbox when ready to proceed. When the "Run" button becomes enabled, the user may click it to begin the process.

PatchMaster will create a thread for each server that will stay with that server throughout the entire process until that server is complete or the timeout period has been reached (step 600). The timeout setting is in the configuration file and can be changed as necessary.

The first thing the thread will do is open the Service Control Manager of the server to determine if the server service is in a running state (step 604). If the server service is not in a running state, the thread will report the status of server as not found, discontinue and close (step 608).

If the server is located, the thread will first attempt to send a reboot message using Windows Management Instrumentation (WMI) (step 612). In order for this method to succeed, remote WMI calls must be allowed in policy and through firewalls. If the WMI method fails, the thread will make another attempt using the InitiateSystemShutdownEx API call. If either succeeds, it will be correctly reported as such in the "PM Update Status" column (step 616). Otherwise the thread will fail, reporting its status, discontinue and close (step 620).

Upon a successful initiation of a system shutdown, the thread will track the server while the reboot is pending, reporting that status (step 624).

Once the server is no longer reachable (step 628), the thread will wait until it is again able to connect to the Service Control Manager and discover the server service in a state of running again (step 632). The status will be reported at this time as "Reboot in Progress" (step 636).

If the timeout period (e.g., a default time could be 15 minutes which can be modified in the configuration file) is reached (step 640) while the thread is waiting for the server to return, the thread reports the status of "Reboot Return Failed" (step 644).

Once the server has completely returned, the thread will report the status of "Reboot Complete" and give the date and time of completion (step 648). Once all servers have completed, a popup window will appear stating such and an email will be generated showing the final status of all servers involved in the process.

APART Processing Logic

FIG. 11 illustrates the high level processing logic for the APART system. The first logic block 200 in the flowchart represents the development or purchase of an application that is to be tracked, monitored and maintained by APART. As indicated in logic block 204, application information is entered into APART. The application information includes, but is not limited to, application ID, application name and acronym, application type, application description, frequency of use, business impact, recovery priority, the developer, and the support organization. Application version information is entered into APART as indicated in logic block 208. This information includes, but is not limited to, version number, version description, tracking number, change management ticket number, status of the version, whether the version is in production, and the server run location.

The application version servers are determined and entered into APART as indicated in logic block 212. For the specific application, this information includes, but is not limited to, version, the server name, server group, server use and server role. Server information needs to be entered for each server included in the APART system. This step is indicated by logic block 216. Server information includes, but is not limited to, server ID, server name, server status, intended purpose, primary use, primary role and call group.

Call group information is entered into APART by application as indicated in logic block 220. Call group information includes, but is not limited to, a general contact list, a 24 hour call list, a day call list and a night call list. Call list information is entered for each individual providing call group support as indicated in logic block 224.

For each application in use in the organization, there is a client base defined for the application. This client base is determined and entered into APART as indicated in logic block 228. Client base information could include, although it is not limited to, business unit and operating company within the organization that uses the application.

Application notes are entered into APART as indicated in logic block 232 and includes information such as the type of note, the note itself (e.g., location of project documentation), and a link to a folder containing documentation or other information regarding the application.

Components of an application version are entered into APART as indicated in logic block 236. Each executable and COM object owned by the application version should be entered as components. Not only are the individual components of an application added, but also dependencies on other applications. The process step of determining and entering application dependencies is indicated in logic block 240. The dependency information can include the dependent application name, its immediate dependency applications/components, and the relationship to the immediate dependency applications/components.

As indicated in logic block 244, server group information is determined for each server and entered into APART. This information includes server group name, group type and group purpose for each server. The applications running on each server are determined as indicated in logic block 248. Information that can be displayed are the application names, production status, server use and server role. Other information for each application running on the server can also be displayed.

As indicated in logic block 252, APART determines the impact of a server's outage by application. For a specific server, APART provides a list of applications running on the server, the server group, and if the applications are critical to operation. The outage impact callout by application is determined as indicated in logic block 256. Outage impact dependencies by application are determined as indicated in logic block 260.

Security Patch Update Processor

FIG. 12 illustrates exemplary processing logic for the security patch update processor as fully described in patent application Ser. No. 11/766,503 which has been incorporated by reference herein. The security patch update processor allows for versioning of the patching process using the configuration file. All steps in the process are prompted by default, although command-line switches can set prompting to silent, suppress reboots, or prompt for reboots only. These settings also can be applied via the configuration file.

The configuration file, named pup.cfg, can be located in the same folder as pup.exe (default setting), in which case command line switches override settings in the configuration file. Registry settings can be added or removed using the configuration file.

All operations performed by the patch update processor are logged by default to a log file located in the same folder location as pup.exe, named pup.log. The log file location and name can be changed to any other location using either the command-line switches or in the configuration file. If the configuration file is used, the name of the file can be represented by the name of the machine creating the file.

The processing logic begins with the patch update processor checking for required components and updates based upon the location set in the configuration file, as indicated in logic block 300. The patch update processor checks for the version of the Microsoft Windows Update Agent (WUA), and updates according to the minimum version, update location, and command line set in the configuration file, as indicated in logic block 304. The patch update processor then sets or removes the Windows Server Update Service (WSUS) settings according to command-line switches or the configuration file, as indicated in logic block 308.

The security patch update processor scans the computer for required security patches as shown in logic block 312. If the patch update processor determines that WSUS settings are set in decision block 316 (e.g., SetWSUS=true), the scan for required security patches takes place against the managed WSUS server as indicated in logic block 320. Otherwise, the scan takes place against the Microsoft Windows Update site as indicated in logic block 324. Next, as indicated in logic block 328, the patches that are determined to be required for the specific machine are downloaded from the managed WSUS server or Microsoft Windows Update site, as appropriate. If WSUS settings are set, the patch download comes from the managed WSUS server, as indicated in logic block 332. If WSUS settings are removed, the patch download comes from the Microsoft Windows Update site, as indicated in logic block 336. Patches are then installed on the machine as indicated in logic block 340. The security patch update processor logs all patch update operations performed to a log file as indicated in logic block 344. The patch process ends in block 350.

Embodiments of the invention have been described as computer-implemented processes. It is important to note, however, that those skilled in the art will appreciate that the mechanisms of the embodiments described are capable of being distributed as a computer readable storage medium in a variety of forms, and that the invention applies regardless of the particular type of computer readable storage medium utilized to carry out the distribution. Examples of computer readable storage media include, without limitation, recordable-type media such as CompactFlash cards, portable hard drives, diskettes, CD ROMs, memory sticks, and flash drives.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the present invention is defined solely by the appended claims.

What is claimed:

1. A method for managing the deployment of software patch updates on a plurality of computers in an enterprise computer network during a patch cycle wherein each computer receives and installs periodic software patch updates automatically, comprising the steps of:
   maintaining an inventory of the computers in a central database that stores a status of each computer for each patch during the patch cycle;
   filtering the computers into at least one filter group and displaying a list of computers in the filter group along with the status for each patch;
   verifying and displaying the status of each patch for each computer in the filter group by: (1) determining if each computer is in an operational state; (2) copying an agent module to each operational computer for scanning each operational computer remotely; (3) running a remote scan of each operational computer and comparing each operational computer to the software patch updates downloaded to a server update service system during a patch cycle to determine if each operational computer requires software patch updates; and (4) displaying a visual indication of the status of each patch for each operational computer;
   performing a controlled software patch update for each non-compliant computer in the filter group by: (1) verifying that each computer is in an operational state; (2) determining if a patch processor module is installed on each computer; (3) creating a task in a task scheduler program to run the patch processor module using a patch processor configuration file; (4) monitoring a log file for each computer for the status of each software patch update on each computer; and (5) displaying a message when the software patch update process completes; and
   performing a controlled reboot of each computer in the filter group following the completion of the software patch updates for the patch cycle.

2. The method for managing the deployment of software patch updates of claim 1 further comprising displaying a patch reboot status report for the patch cycle identifying each computer in the filter group, an associated filter group, and an enforcement state.

3. The method for managing the deployment of software patch updates of claim 1 wherein the at least one filter group comprises a patch group, a boot group, or a boot day.

4. The method for managing the deployment of software patch updates of claim 1 further comprising applying additional filtering of the computers in the filter group to display the status of patch updates for each computer instead of the status of each patch for each computer.

5. The method for managing the deployment of software patch updates of claim 1 further comprising applying additional filtering of the computers in the filter group to display a list of computers that are pending reboot following the completion of the software patch updates.

6. The method for managing the deployment of software patch updates of claim 1 further comprising applying additional filtering of the computers in the filter group to display a list of computers that are non-compliant with the software patch updates.

7. The method for managing the deployment of software patch updates of claim 1 wherein the step of performing a controlled reboot of each computer in the filter group comprises: (1) determining if each computer to be rebooted is in an operational state: (2) sending a reboot message to each computer; (3) tracking and reporting the status of each computer while the reboot is pending; (4) waiting for each computer to reach a running state following the reboot; and (5) reporting a status of each computer during the reboot.

8. A system for managing the deployment of software patch updates on a plurality of computers in an enterprise computer network during a patch cycle wherein each computer receives and installs periodic software patch updates automatically, comprising:
   a computer processor for executing a plurality of components;
   a memory for storing an inventory of the computers in a central database;
   a component for maintaining the inventory of the computers stored in the central database by storing a status of each computer for each patch during the patch cycle;
   a component for filtering the computers into at least one filter group and displaying a list of computers in the filter group along with the status for each patch;
   a component for verifying and displaying the status of each patch for each computer in the filter group including: (1) a module for determining if each computer is in an operational state; (2) a module for copying an agent module to each operational computer for scanning each operational computer remotely; (3) a module for running a remote scan of each operational computer and comparing each operational computer to the software patch updates downloaded to a server update service system during a patch cycle to determine if each operational computer requires software patch updates; and a module for (4) displaying a visual indication of the status of each patch for each operational computer;
   a component for performing a controlled software patch update for each non-compliant computer in the fitter group including: (1) a module for verifying that each computer is in an operational state; (2) a module for determining if a patch processor module is installed on each computer; (3) a module for creating a task in a task scheduler program to run the patch processor module using a patch processor configuration file; (4) a module for monitoring a log file for each computer for the status of each software patch update on each computer; and (5) a module for displaying a message when the software patch update process completes; and
   a component for performing a controlled reboot of each computer in the filter group following the completion of the software patch updates for the patch cycle.

9. The system for managing the deployment of software patch updates of claim 8 further comprising a component for displaying a patch reboot status report for the patch cycle identifying each computer in the filter group, an associated filter group, and an enforcement state.

10. The system for managing the deployment of software patch updates of claim 8 wherein the at least one filter group comprises a patch group, a boot group, or a boot day.

11. The system for managing the deployment of software patch updates of claim 8 further comprising a component for applying additional filtering of the computers in the filter group to display the status of patch updates for each computer instead of the status of each patch for each computer.

12. The system for managing the deployment of software patch updates of claim 8 further comprising a component for applying additional filtering of the computers in the filter group to display a list of computers that are pending reboot following the completion of the software patch updates.

13. The system for managing the deployment of software patch updates of claim 8 further comprising a component for applying additional filtering of the computers in the filter group to display a list of computers that are non-compliant with the software patch updates.

14. The system for managing the deployment of software patch updates of claim 8 wherein component for performing a controlled reboot of each computer in the filter group comprises: (1) a module for determining if each computer to be rebooted is in an operational state: (2) a module for sending a reboot message to each computer; (3) a module for tracking and reporting the status of each computer while the reboot is pending; (4) a module for waiting for each computer to reach a running state following the reboot; and (5) a module for reporting a status of each computer during the reboot.

15. A computer readable storage medium for managing the deployment of software patch updates on a plurality of computers in an enterprise computer network during a patch cycle when executed on a computing system wherein each computer receives and installs periodic software patch updates automatically, the computer readable storage medium having computer readable code embedded therein, comprising:

program instructions that maintain an inventory of the computers in a central database that stores a status of each computer for each patch during the patch cycle;

program instructions that filter the computers into at least one filter group and display a list of computers in the filter group along with the status for each patch;

program instructions that verify and display the status of each patch for each computer in the filter group including: (1) program instructions that determine if each computer is in an operational state; (2) program instructions that copy an agent module to each operational computer for scanning each operational computer remotely; (3) program instructions that run a remote scan of each operational computer and compare each operational computer to the software patch updates downloaded to a server update service system during a patch cycle to determine if each operational computer requires software patch updates; and (4) program instructions that display a visual indication of the status of each patch for each operational computer;

program instructions that perform a controlled software patch update for each non-compliant computer in the filter group including: (1) program instructions that verify that each computer is in an operational state; (2) program instructions that determine if a patch processor module is installed on each computer; (3) program instructions that create a task in a task scheduler program to run the patch processor module using a patch processor configuration file; (4) program instructions that monitor a log file for each computer for the status of each software patch update on each computer; and (5) program instructions that display a message when the software patch update process completes; and program instructions that perform a controlled reboot of each computer in the filter group following the completion of the software patch updates for the patch cycle.

16. The computer readable storage medium for managing the deployment of software patch updates of claim 15 further comprising program instructions that display a patch reboot status report for the patch cycle identifying each computer in the filter group, an associated filter group, and an enforcement state.

17. The computer readable storage medium for managing the deployment of software patch updates of claim 15 wherein the at least one filter group comprises a patch group, a boot group, or a boot day.

18. The computer readable storage medium for managing the deployment of software patch updates of claim 15 further comprising program instructions that apply additional filtering of the computers in the filter group to display the status of patch updates for each computer instead of the status of each patch for each computer.

19. The computer readable storage medium for managing the deployment of software patch updates of claim 15 further comprising program instructions that apply additional filtering of the computers in the filter group to display a list of computers that are pending reboot following the completion of the software patch updates.

20. The computer readable storage medium for managing the deployment of software patch updates of claim 15 further comprising program instructions that apply additional filtering of the computers in the filter group to display a list of computers that are non-compliant with the software patch updates.

21. The computer readable storage medium for managing the deployment of software patch updates of claim 15 wherein the program instructions that perform a controlled reboot of each computer in the filter group comprise: (1) program instructions that determine if each computer to be rebooted is in an operational state: (2) program instructions that send a reboot message to each computer; (3) program instructions that track and report the status of each computer while the reboot is pending; (4) program instructions that wait for each computer to reach a running state following the reboot; and (5) program instructions that report a status of each computer during the reboot.

* * * * *